(12) United States Patent
Yoshida et al.

(10) Patent No.: US 8,363,193 B2
(45) Date of Patent: Jan. 29, 2013

(54) LIQUID CRYSTAL DISPLAY PANEL

(75) Inventors: Shuhei Yoshida, Tottori (JP); Joji Nishimura, Nagano (JP); Toshinori Uehara, Tottori (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 12/828,979

(22) Filed: Jul. 1, 2010

(65) Prior Publication Data

US 2011/0007256 A1    Jan. 13, 2011

(30) Foreign Application Priority Data

Jul. 9, 2009  (JP) ............................... P2009-162451

(51) Int. Cl.
*G02F 1/1343*   (2006.01)
(52) U.S. Cl. .......................................... 349/139; 349/40
(58) Field of Classification Search .................. 349/139, 349/129, 106, 110, 40, 43
See application file for complete search history.

(56) References Cited

U.S. PATENT DOCUMENTS

| 2008/0117372 A1 | 5/2008 | Ogino |
| 2009/0046232 A1* | 2/2009 | Matsuyama et al. .......... 349/139 |

FOREIGN PATENT DOCUMENTS

| JP | 2008-129405 | 6/2008 |
| JP | 2008-209529 | 11/2008 |

* cited by examiner

*Primary Examiner* — Thoi Duong
(74) *Attorney, Agent, or Firm* — K&L Gates LLP (57) ABSTRACT

A liquid crystal display panel includes: a pair of substrates arranged to be opposite each other to sandwich a liquid crystal layer, an upper electrode in which a plurality of slit-shaped openings are provided in parallel in each of a plurality of subpixels formed in a display region being provided on one of the pair of substrates, a lower electrode being formed on the substrate through the upper electrode and an insulating film, and a shield electrode being formed on the other substrate to face the liquid crystal layer, wherein, when the pitch between adjacent slit-shaped openings is P, and the width of the upper electrode between adjacent slit-shaped openings is L, L/P is in a range of 45% to 55%.

2 Claims, 5 Drawing Sheets

LIQUID CRYSTAL DISPLAY PANEL

CROSS REFERENCES TO RELATED APPLICATIONS

The present application claims priority to Japanese Patent Application JP 2009-162451 filed on Jul. 9, 2009, the entire contents of which is hereby incorporated by reference.

BACKGROUND

The present disclosure relates to a transverse electric field type liquid crystal display panel, and in particular, to an FFS (Fringe Field Switching) mode liquid crystal display panel in which a shield electrode is formed on a color filter substrate to face a liquid crystal layer, and which has good transmittance and a drive voltage not so high.

A liquid crystal display panel is lightweight and thin and has low power consumption compared to a CRT (Cathode-Ray Tube), and is thus widely used in many electronic apparatuses for display. The liquid crystal display panel is configured such that the orientation of liquid crystal molecules arranged in a predetermined direction is changed by an electric field, thus the transmitted amount of light of a liquid crystal layer is changed to display an image. A liquid crystal display panel includes a reflective liquid crystal display panel in which external light is input to the liquid crystal layer, is reflected by a reflecting plate, transmits again the liquid crystal layer, and is emitted, a transmissive liquid crystal display panel in which incident light from a backlight device transmits the liquid crystal layer, and a transflective liquid crystal display panel having both the reflective and transmissive portions.

As a method of applying an electric field to the liquid crystal layer of the liquid crystal display panel, there are a longitudinal electric field type and a transverse electric field type. A longitudinal electric field type liquid crystal display panel is configured such that an electric field in a substantially longitudinal direction is applied to liquid crystal molecules by a pair of electrodes arranged with a liquid crystal layer sandwiched therebetween. As the longitudinal electric field liquid crystal display panel, there are a TN (Twisted Nematic) mode, a VA (Vertical Alignment) mode, an MVA (Multi-domain Vertical Alignment) mode, and the like. A transverse electric field type liquid crystal display panel is configured such that a pair of electrodes are provided on the inner surface of one of a pair of substrates arranged with a liquid crystal layer sandwiched therebetween to be insulated from each other, and an electric field in a substantially transverse direction is applied to liquid crystal molecules. As the transverse electric field type liquid crystal display panel, there are an IPS (In-Plane Switching) mode where a pair of electrodes do not overlap each other in plan view, an FFS mode where a pair of electrodes overlap each other in plan view, and the like.

Of these, an IPS mode liquid crystal display panel is configured such that a pair of electrodes including a pixel electrode and a common electrode are comb-shaped to be meshed with each other in a state of being electrically insulated from each other, and an electric field in a transverse direction is applied to liquid crystal between the pixel electrode and the common electrode. The IPS mode liquid crystal display panel advantageously has a wide viewing angle compared to the longitudinal electric field type liquid crystal display panel.

An FFS mode liquid crystal display panel is configured such that a pair of electrodes including a common electrode and a pixel electrode are arranged in different layers through an insulating film, a slit-shaped opening is provided in the common electrode or the pixel electrode facing the liquid crystal layer, and an electric field in a substantially transverse direction which passes through the slit-shaped opening is applied to a liquid crystal layer. The FFS mode liquid crystal display panel can obtain a wide viewing angle and improve image contrast, and is increasingly used in recent years. As the FFS mode liquid crystal display panel, there are a liquid crystal display panel where the common electrode and the pixel electrode are formed on the substantially same plane as a thin film transistor (TFT) serving as a switching element, and a liquid crystal display panel where the common electrode and the pixel electrode are both arranged above the TFT.

Of these, in the FFS mode liquid crystal display panel where the common electrode and the pixel electrode are both arranged above the TFT, the surface of the TFT or the like is coated with an interlayer resin film, and a lower electrode formed of a transparent conductive material and an upper electrode having a slit-shaped opening are formed on the surface of the interlayer resin film with an inter-electrode insulating film sandwiched therebetween. The upper electrode and the lower electrode can be both operated as the pixel electrode and the common electrode.

While in the longitudinal electric field type liquid crystal display panel, the common electrode is formed on the transparent substrate to face the display surface, in the transverse electric field type liquid crystal display panel, no electrode is formed. For this reason, in the transverse electric field type liquid crystal display panel, the alignment of liquid crystal molecules may be disturbed due to static electricity from the outside, such as a person's finger. Thus, as the transverse electric field type liquid crystal display panel, JP-A-2008-209529 describes a liquid crystal display panel in which a transparent conductive electrode (hereinafter, referred to as "shield electrode") for static electricity prevention is molded on the transparent substrate of the color filter substrate to face the display surface so as to prevent an image from being disturbed due to static electricity.

Further, as the transverse electric field type liquid crystal display panel, JP-A-2008-129405 describes a liquid crystal display panel in which a shield electrode is molded on the transparent substrate of the color filter substrate to face the liquid crystal layer. Hereinafter, the shield electrode which is molded on the transparent substrate to face the display surface is referred to as "outside shield", and the shield electrode which is molded on the transparent surface to face the liquid crystal layer is referred to as "inside shield".

In the case of an outside shield, the upper electrode or lower electrode which is operated as the pixel electrode and the shield electrode are away from each other by equal to or greater than the thickness of the transparent substrate. Thus, even when a longitudinal electric field formed between the shield electrode and the pixel electrode is applied to the liquid crystal layer, advantageously, there is little influence on transmittance. Therefore, in the case of the outside shield, transmittance is high, and there is little variation between the directions of the electric field in the subpixels, and as a result, the drive voltage can be reduced.

In contrast, in the case of an inside shield, it is advantageous in that the shield electrode can be formed on the transparent substrate to face the liquid crystal layer by the same step as the forming step of the common electrode in the longitudinal electric field type liquid crystal display panel of the related art. Therefore, in the case of the inside shield, even when a liquid crystal display panel for a large plate is used, it is not necessary to newly provide a large-scale device for inside shield electrode formation. Further, in the case of the inside shield, since the shield electrode is not exposed to the outside, the shield electrode is unlikely to be damaged. In particular, it is effective for a liquid crystal display panel on which a finger touches. As described above, the outside shield and the inside shield respectively have advantages and disadvantages, thus both are appropriately selected and manufactured.

SUMMARY

The only difference between the outside shield and the inside shield resides in the forming position of the shield electrode on the transparent substrate. However, if the forming position of the shield electrode is changed, the transmittance or drive voltage may be changed. This change occurs due to a longitudinal electric field between the shield electrode and the pixel electrode. That is, like the inside shield, if the shield electrode and the pixel electrode come close to each other and the longitudinal electric field increases, the transmittance is degraded, and the drive voltage increases. In the case of the outside shield, the shield electrode and the pixel electrode are away from each other by equal to or greater than the thickness of the transparent substrate. Thus, even when the shield electrode is added, there is little influence from the longitudinal electric field, thus countermeasures are not a significant problem. However, in the case of the inside shield, since the distance between the shield electrode and the pixel electrode is short, there is a significant influence of the longitudinal electric field due to addition of the shield electrode, and a countermeasure should be provided.

Thus, it is desirable to solve the problems regarding an inside shield type FFS mode liquid crystal display panel in which there is a significant influence of a longitudinal electric field. That is, it is desirable to provide an inside shield type FFS mode liquid crystal display panel which has good transmittance and uses a drive voltage not so high by examining the relationship between transmittance and drive voltage regarding various shapes of slit-shaped openings.

An embodiment provides a liquid crystal display panel. The liquid crystal display panel includes a pair of substrates arranged to be opposite each other to sandwich a liquid crystal layer. An upper electrode in which a plurality of slit-shaped openings are provided in parallel in each of a plurality of subpixels formed in a display region is provided on one of the pair of substrates, a lower electrode is formed on the substrate through the upper electrode and an insulating film, and a shield electrode is formed on the other substrate to face the liquid crystal layer. When the pitch between adjacent slit-shaped openings is P, and the width of the upper electrode between adjacent slit-shaped openings is L, L/P is in a range of 45% to 55%.

In the FFS mode liquid crystal display panel of the embodiment, if an outside shield type is changed to an inside shield type with the optimum slit-shaped openings unchanged, the transmittance is degraded and the drive voltage increases. With this liquid crystal display panel, even in the inside shield type FFS mode liquid crystal display panel, a liquid crystal display panel is obtained which has good transmittance and with a low drive voltage, as it can be confirmed from the relationship between the transmittance and drive voltage acquired regarding the L/P of the various slit-shaped openings. If L/P is smaller than 45%, the drive voltage is low but the degree of degradation of transmittance increases, and if L/P exceeds 55%, the transmittance is satisfactory but the drive voltage is excessively high. Thus, both cases are not preferable.

In the liquid crystal display panel of the embodiment, when transmittance is T, and a drive voltage which is applied between the upper electrode and the lower electrode is V, an efficiency value E expressed by $T^3/V$ may be equal to or greater than 95% of the maximum value, and the transmittance T may be equal to or greater than 98% of the maximum value.

In the inside shield type FFS mode liquid crystal display panel of the embodiment, the range of L/P where the efficiency value E expressed by $T^3/V$ is equal to or greater than 95% of the maximum value is 38% to 55%. However, if L/P is smaller than 45%, undesirably, the transmittance T is smaller than 98%. If the efficiency value E is smaller than 95% of the maximum value, undesirably, the effective ratio of the applied voltage to the transmittance decreases.

In the liquid crystal display panel of the embodiment, the upper electrode may be a common electrode.

In the FFS mode liquid crystal display panel, the upper electrode can be operated as the pixel electrode or the common electrode. In the liquid crystal display panel of the embodiment, since the upper electrode is operated as the common electrode, the distance between the shield electrode formed to serve as an inside shield and the pixel electrode is extended compared to a case where the upper electrode is operated as the pixel electrode. Therefore, the degradation of transmittance due to a longitudinal electric field generated by the shield electrode decreases.

Additional features and advantages are described herein, and will be apparent from the following Detailed Description and the figures.

DETAILED DESCRIPTION

Hereinafter, a mode for carrying out the invention will be described with reference to an embodiment and the drawings.

The term "surfaces" of an array substrate and a color filter substrate refer to a surface on which various wirings are formed and a surface which faces liquid crystal. In the drawings for description, the size of each layer or member is adjusted to be recognizable on the drawings, not necessarily proportional to the actual size.

Figure 2:
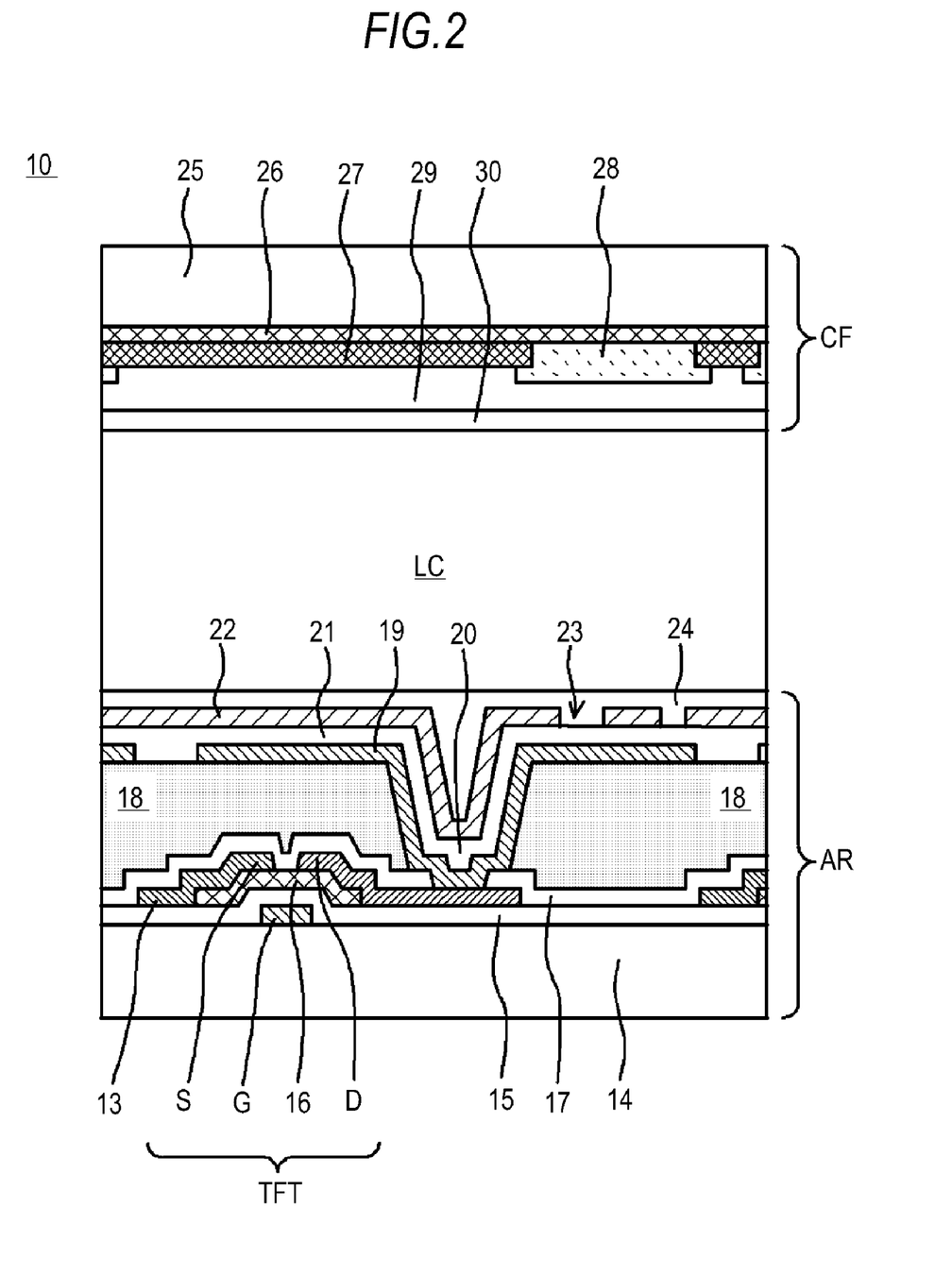
FIG. 2 is a sectional view taken along the line II-II of FIG. 1 in this embodiment.
Figure 3:
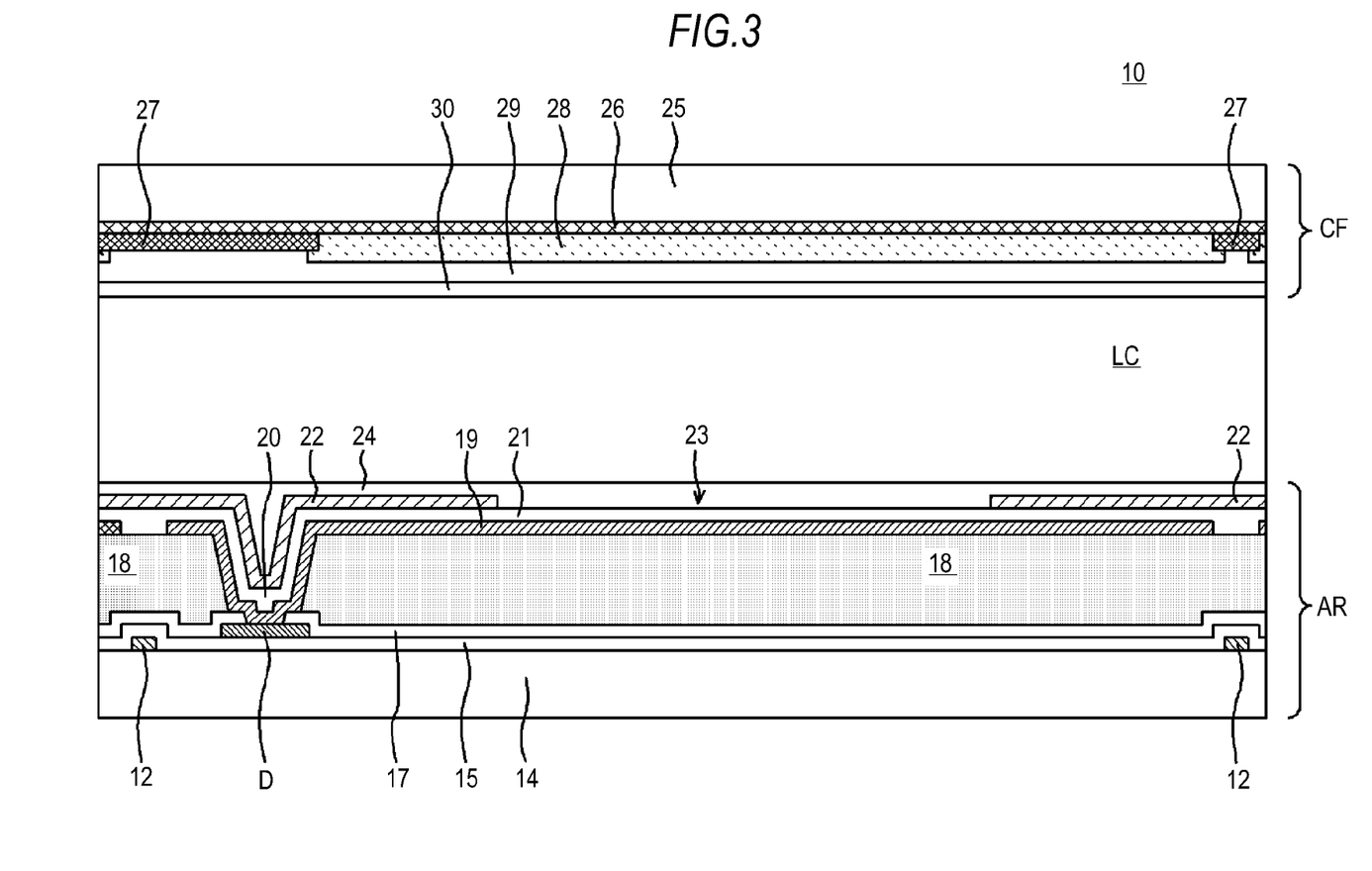
FIG. 3 is a sectional view taken along the line III-III of FIG. 1 in this embodiment.

The configuration of a main part of one subpixel in a liquid crystal display panel 10 of this embodiment will be described with reference to FIGS. 1 to 3. As shown in FIGS. 2 and 3, the liquid crystal display panel 10 is configured such that liquid crystal LC is sandwiched between an array substrate AR and a color filter substrate CF. Though not shown, the liquid crystal display panel 10 has a plurality of subpixels arranged in the row and column directions. One pixel has subpixels for three colors of R (red), G (green), and B (blue). The light components of these colors are mixed to determine a display color of each pixel.

Figure 1:
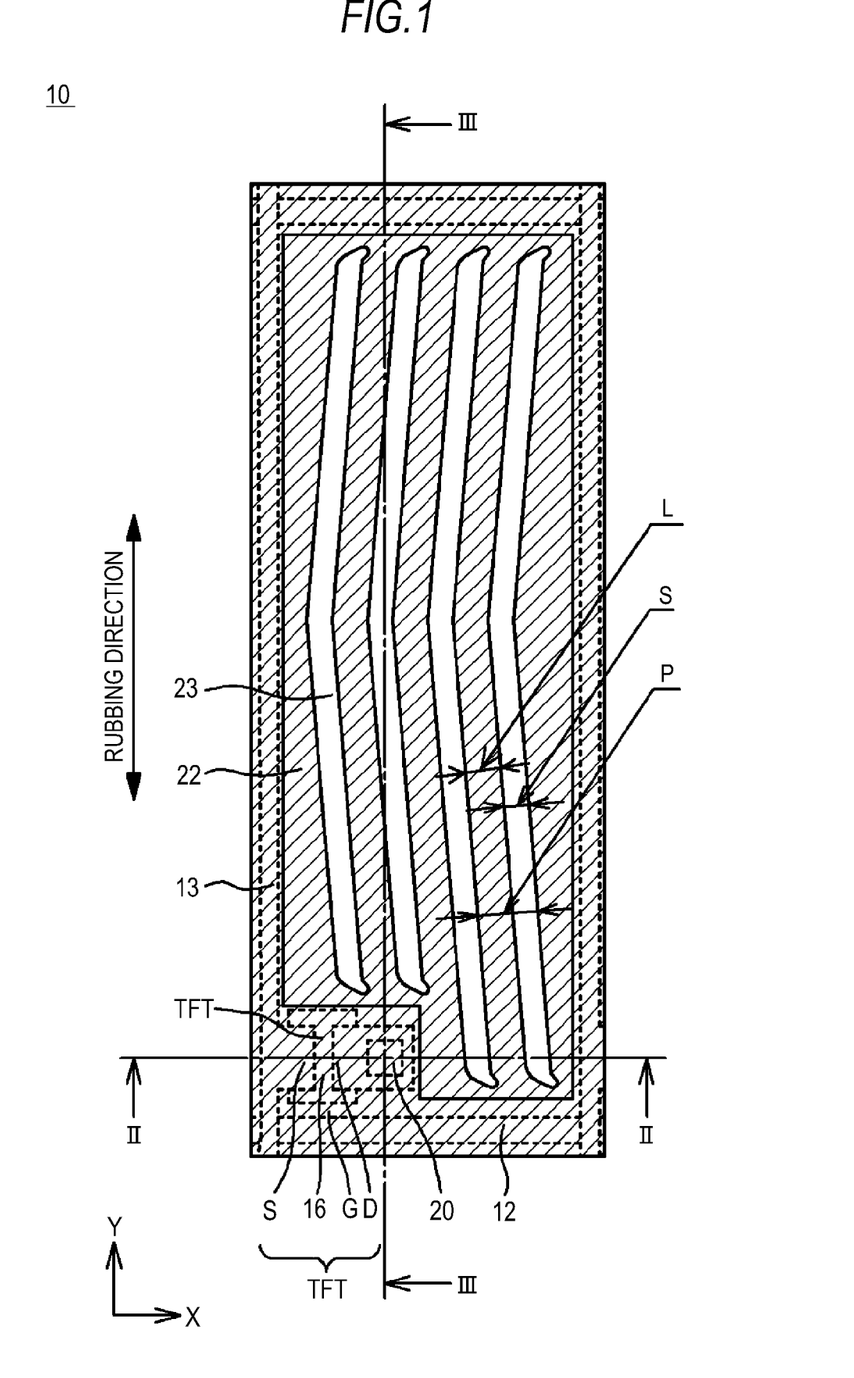
FIG. 1 is a plan view showing the outline of an array substrate of one pixel in this embodiment.

As shown in FIG. 1, each subpixel of the array substrate AR includes, for example, a scanning line 12 which extends in an X-axis direction and is formed of nontransparent metal, such as aluminum or molybdenum, a signal line 13 which extends in a Y-axis direction and is formed of nontransparent metal, such as aluminum or molybdenum, and a TFT which is arranged at vicinity of an intersection of the scanning line 12 and the signal line 13.

The array substrate AR has, as a base, a first transparent substrate 14 which is formed of glass, quartz, plastic, or the like having transparent insulation properties. Scanning lines 12 are formed on the first transparent substrate 14 to face the liquid crystal LC. A gate electrode G extends from the corresponding scanning line 12. A transparent gate insulating film 15 formed of silicon nitride, silicon oxide, or the like is laminated so as to cover the scanning line 12 and the gate electrode G. A semiconductor layer 16 formed of amorphous silicon, polysilicon, or the like is formed on the gate insulating film 15 which overlaps the gate electrode G in plan view. A plurality of signal lines 13 formed of metal, such as aluminum or molybdenum, are formed on the gate insulating film 15 in the Y-axis direction (column direction) of FIG. 1. Each region defined by the scanning lines 12 and the signal lines 13 becomes a subpixel region. A source electrode S extends from the corresponding signal line 13, and the source electrode S is partially in contact with the surface of the semiconductor layer 16.

A drain electrode D which is simultaneously formed of the same material as the signal lines 13 and the source electrode S is provided on the gate insulating film 15. The drain electrode D is arranged to be close to the source electrode S and partially in contact with the semiconductor layer 16. The three subpixels for R (red), G (green), and B (blue) form one pixel (not shown) having a substantially square shape. Thus, as shown in FIG. 1, one subpixel trisected from the pixel has an oblong shape in which the scanning line 12 forms a short side and the signal line 13 forms a long side. The gate electrode G, the gate insulating film 15, the semiconductor layer 16, the source electrode S, and the drain electrode D constitute the TFT serving as a switching element, such that the TFT is formed in each subpixel.

A transparent passivation film 17 formed of, for example, silicon nitride, silicon oxide, or the like is laminated so as to cover the exposed portions of the signal line 13, the thin film transistor TFT, and the gate insulating film 15. An interlayer resin film 18 formed of transparent resin material, for example, photoresist or the like is laminated so as to cover the passivation film 17. A lower electrode 19 formed of a transparent conductive material, such as ITO (Indium Tin Oxide) or IZO (Indium Zinc Oxide), is formed so as to cover the interlayer resin film 18. A contact hole 20 is formed which passes through the interlayer resin film 18 and the passivation film 17 and reaches the drain electrode D, and the lower electrode 19 and the drain electrode D are electrically connected to each other through the contact hole 20. Thus, the lower electrode 19 is operated as a pixel electrode.

A transparent inter-electrode insulating film 21 formed of, for example, silicon nitride, silicon oxide, or the like is laminated so as to cover the lower electrode 19. An upper electrode 22 formed of a transparent conductive material, such as ITO or IZO, is formed so as to cover the inter-electrode insulating film 21. In the liquid crystal display panel 10 of this embodiment, the upper electrode 22 is connected to a common wiring at the peripheral portion of the display region (not shown) and is operated as a common electrode.

As shown in FIG. 1, the upper electrode 22 has a plurality of slit-shaped openings 23. The slit-shaped openings 23 are formed by exposing and developing a photoresist material coated on the surface of the upper electrode 22 using a photolithography method, and then etching the upper electrode 22. A first alignment film 24 formed of polyimide is laminated so as to cover the upper electrode 22. The first alignment film 24 is subjected to liquid crystal alignment processing, that is, rubbing processing in the Y-axis direction (a direction substantially parallel to the extension direction of the signal line 13) of FIG. 1.

The slit-shaped openings 23 will be described in detail. In the liquid crystal display panel 10 of this embodiment, the upper electrode 22 has a plurality of slit-shaped openings 23 having a rotated "V" shape which extend in the extension direction of the signal line 13 at regular intervals. As shown in FIG. 1, the interval (pitch) between the slit-shaped openings 23 is P, and the slit width is S. Thus, the width of the upper electrode 22 between adjacent slit-shaped openings 23 is L=P−S. Since the subpixel is vertically long, if the slit-shaped openings 23 are extended in the transverse direction, the number of end portions of the slit-shaped openings 23 increases. The end portions of the slit-shaped openings 23 become an abnormal alignment region of liquid crystal molecules. Thus, in the liquid crystal display panel 10 of this embodiment, as shown in FIG. 1, the extension direction of the slit-shaped openings 23 is the Y-axis direction, such that the number of end portions of the slit-shaped openings 23 decreases and the degradation of the aperture ratio is reduced.

The extension direction of the slit-shaped openings 23 having a rotated "V" shape is inclined at about +5 degrees and about −5 degrees with respect to the rubbing direction. If the slit-shaped openings 23 are all inclined in the clockwise or counterclockwise direction with respect to the rubbing direction, the liquid crystal molecules are twisted in one direction, thus a color is changed in accordance with the viewing-angle direction. This is because an apparent retardation is changed in accordance with the direction in which the liquid crystal molecules are viewed. In the liquid crystal display panel 10 of this embodiment, in order to reduce this change, a domain is provided where the extension direction of the slit-shaped openings 23 is inclined at about +5 degrees with respect to the clockwise direction, and a domain is provided where the extension direction of the slit-shaped openings 23 is inclined at about −5 degrees with respect to the clockwise direction.

As shown in FIGS. 2 and 3, the color filter substrate CF has, as a base, an insulating second transparent substrate 25 formed of glass, quartz, plastic, or the like having transparent insulation properties. A shield electrode 26 formed of a transparent conductive material, such as ITO or IZO, is formed in the lowermost layer of the second transparent substrate 25, that is, on the outermost surface of the second transparent substrate 25 over the entire region of the subpixel. The shield electrode 26 is operated as an electrode for preventing the alignment of the liquid crystal molecules from being disturbed due to static electricity from the outside, such as a person's finger. In the liquid crystal display panel 10 of this embodiment, on the shield electrode 26 are formed a light-blocking layer 27 which is formed of, for example, light-blocking resin at positions opposite the scanning line 12, the signal line 13, and the thin film transistor TFT, and a color filter layer 28 which transmits light (for example, R, G, B, or colorless) of different color for each subpixel.

An overcoat layer 29 formed of, for example, a transparent resin material, such as photoresist, is laminated so as to cover the light-blocking layer 27 and the color filter layer 28. The overcoat layer 29 is formed so as to planarize a step due to the color filter layer 28 of different color and to block an impurity flowing from the light-blocking layer 27 or the color filter layer 28 into the liquid crystal LC. A second alignment film 30 is formed of, for example, polyimide so as to cover the overcoat layer 29. The second alignment film 30 is subjected to rubbing processing in the reverse direction to the first alignment film 24.

The array substrate AR and the color filter substrate CF formed as above are arranged to be opposite each other, and bonded to each other by a sealant (not shown) which is provided at the periphery of both substrates. Then, homogeneously aligned liquid crystal is filled between both substrates. Thus, the liquid crystal display panel 10 of this embodiment is obtained. Columnar spacer (not shown) are formed, for example, on the color filter substrate CF so as to maintain the liquid crystal LC at a predetermined thickness.

With the above-described configuration, in the liquid crystal display panel 10 of this embodiment, if the TFT of each subpixel is put in the ON state, an electric field is generated between the lower electrode 19 and the upper electrode 22, and the alignment of liquid crystal molecules of the liquid crystal LC is changed. Thus, the transmittance of the liquid crystal LC is changed, such that an image is displayed in the FFS mode. A region where the lower electrode 19 and the upper electrode 22 are opposite each other with the inter-electrode insulating film 21 sandwiched therebetween forms an auxiliary capacitor. When the TFT is put in the OFF state, the auxiliary capacitor holds the electric field between the lower electrode 19 and the upper electrode 22 for a predetermined time.

Hereinafter, with regard to the inside shield type liquid crystal display panel 10 of this embodiment and an outside shield type liquid crystal display panel of a comparative example which has the same configuration as the liquid crystal display panel 10 of the above-described embodiment, except that a shield electrode is formed on the rear surface of the color filter substrate CF, various characteristics were measured while varying L/P. The pitch has a fixed value of P=8 µm. The results are shown in FIGS. 4A to 5B.

Figure 4A:
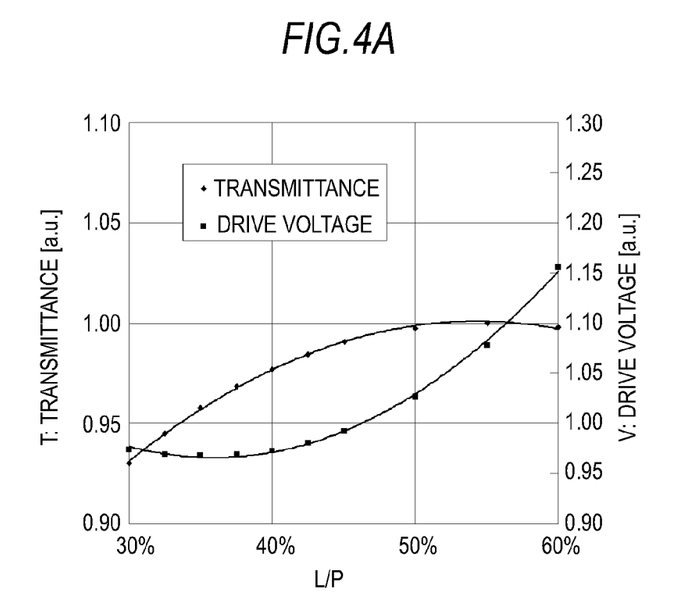
FIG. 4A is a graph showing the relationship between transmittance and a drive voltage with respect to an electrode width in a liquid crystal display panel of an embodiment.
Figure 4B:
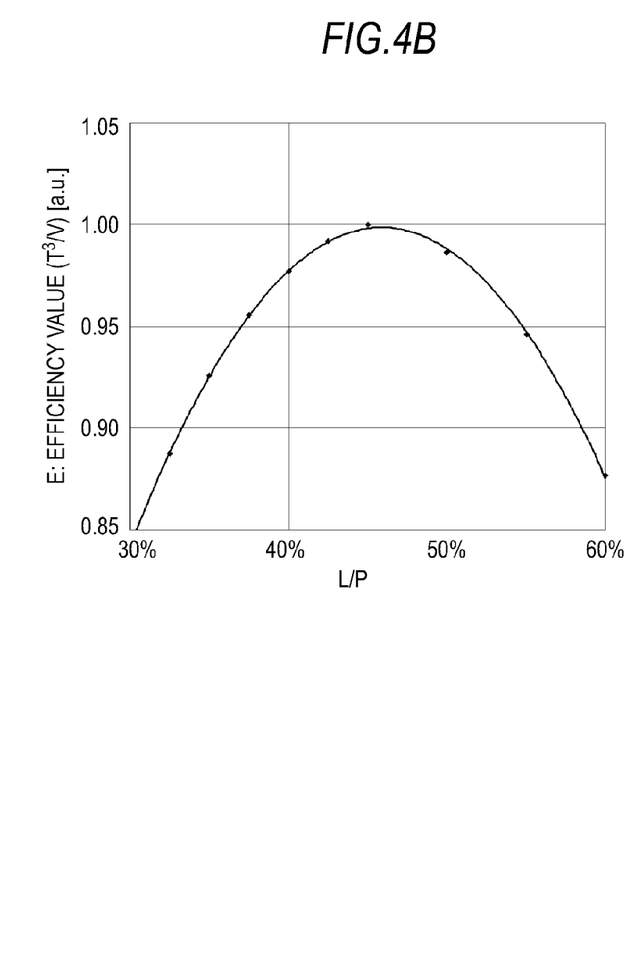
FIG. 4B is a graph showing the relationship of an efficiency value $T^3/V$ with respect to an electrode width.
Figure 5A:
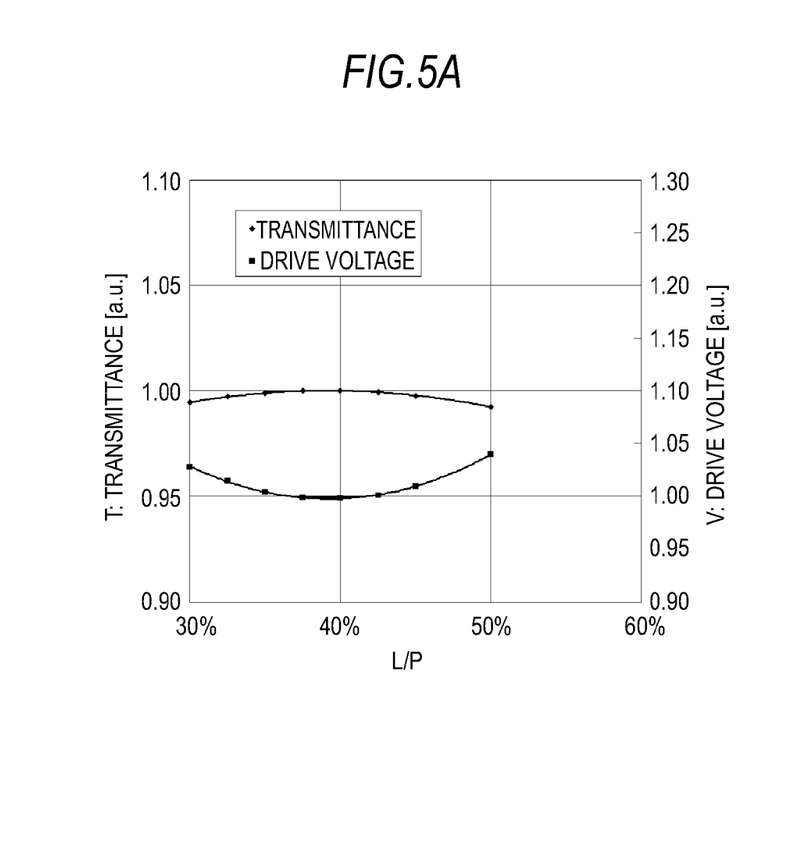
FIG. 5A is a graph showing the relationship between transmittance and a drive voltage with respect to an electrode width in a liquid crystal display panel of a comparative example.
Figure 5B:
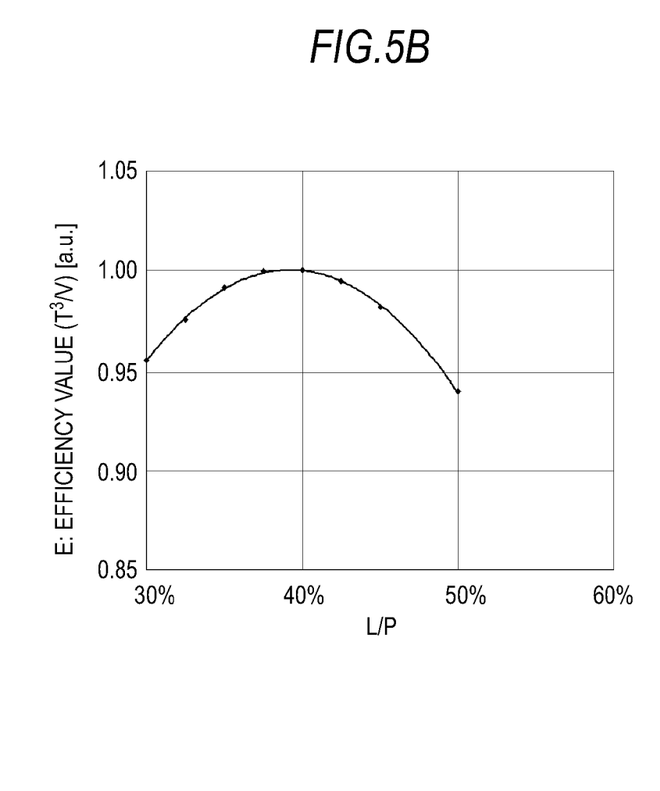
FIG. 5B is a graph showing the relationship of an efficiency value $T^3/V$ with respect to an electrode width.

FIG. 4A is a graph showing transmittance T and a drive voltage V with respect to (the electrode width between the slit-shaped openings 23)/(the pitch between the slit-shaped openings)=L/P in the liquid crystal display panel 10 of this embodiment. FIG. 4B is a graph showing efficiency with regard to the electrode width L/the pitch P between the slit-shaped openings 23. FIG. 5A is a graph showing transmittance T and a drive voltage V with regard to (the electrode width between the slit-shaped openings)/(the pitch between the slit-shaped openings)=L/P in the liquid crystal display panel of the comparative example. FIG. 5B is a graph showing efficiency with regard to the electrode width L/the pitch P between the slit-shaped openings 23.

Here, in order to comprehensively evaluate the relationship between the transmittance T and the drive voltage V, a parameter represented by an efficiency value $E=T^3/V$ was introduced. The reason why the efficiency value E is introduced as the parameter is as follows. In the liquid crystal display panel, since there are many cases where luminance is treated as important rather than power consumption, the transmittance T is cubed, such that comprehensive evaluation is enable in which the transmittance T is treated as important rather than the drive voltage V.

In FIG. 4A, the transmittance T is a relative value representing the ratio with respect to the maximum value when L/P=55%. Similarly, the drive voltage V is a relative value representing the ratio with respect to the drive voltage when L/P=45%. In FIG. 4B, the efficiency value E is a relative value representing the ratio with respect to the maximum value when L/P=48%. In FIG. 5A, the transmittance T is a relative value representing the ratio with respect to the maximum value when L/P=40%. Similarly, the drive voltage V is a relative value representing the ratio with respect to the maximum value when L/P=40%. In FIG. 5B, the efficiency value E is a relative value representing the ratio with respect to the maximum value when L/P=40%.

It can be understood from the result shown in FIG. 4A that, in the liquid crystal display panel 10 of the embodiment, when L/P is in a range of 30% to 55%, the transmittance T increases with an increase in L/P, and if L/P exceeds 55%, the transmittance T decreases rather. According to the result shown in FIG. 4A, when L/P is equal to or greater than 45% and equal to or smaller than 55%, the transmittance T is equal to or greater than 98%. Further, it can be understood that the drive voltage V has the minimum value around L/P=35%, if L/P is smaller than 35%, the drive voltage V increases rather, and if L/P is greater than 35%, the drive voltage V significantly increases in proportion to an increase in L/P.

It can be understood from the result shown in FIG. 4B that the efficiency value E has the minimum value when L/P is around 45%, and even when L/P is smaller or greater than 45%, the efficiency value E decreases. According to the result shown in FIG. 4B, when L/P is equal to or greater than 38% and equal to or smaller than 55%, the efficiency value E is equal to or greater than 95%.

It can be understood comprehensively from the results shown in FIGS. 4A and 4B that when L/P is equal to or greater than 45% and equal to or smaller than 55%, the transmittance is equal to or greater than 98%, the drive voltage V is not so high, and the efficiency value E is equal to or greater than 95%. Therefore, in the inside shield type FFS mode liquid crystal display panel, it can be understood that, if L/P is in a range of 45% to 55%, the transmittance T is high, the efficiency value E is large, and the drive voltage V is not so high.

In the outside shield type FFS mode liquid crystal display panel of the comparative example, as shown in FIGS. 5A and 5B, around L/P=40%, the transmittance T has the maximum value, the drive voltage V has the minimum value, and the efficiency value E has the maximum value. Thus, in the outside shield type FFS mode liquid crystal display panel, it can be confirmed that, if L/P is about 40%, the transmittance T is maximum, the drive voltage V is minimum, and the efficiency value E is maximum.

As described above, in the FFS mode liquid crystal display panel, the characteristics of the transmittance T, the drive voltage V, and the efficiency value E differ between the inside shield type and the outside shield type. In the inside shield type FFS mode liquid crystal display panel, like the embodiment of the invention, it can be understood that, if L/P is in a range of 45% to 55%, the transmittance T is high, the drive voltage V is not so high, and the efficiency value E is high.

Although the FFS mode liquid crystal display panel of the embodiment has been described in which the upper electrode is operated as the common electrode, in the FFS mode liquid crystal display panel in which the upper electrode is operated as the pixel electrode, the pixel electrode and the shield electrode is closer to each other. Thus, while the above-described tendency is further intensified, the FFS mode liquid crystal display panel having the same tendency is obtained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A liquid crystal display panel comprising:
a pair of substrates arranged opposite to each other to sandwich a liquid crystal layer, an upper electrode in which a plurality of slit-shaped openings are provided in parallel in each of a plurality of subpixels formed in a display region being provided on one of the pair of substrates, a lower electrode being formed on the substrate through the upper electrode and an insulating film, and a shield electrode being formed on the other substrate to face the liquid crystal layer, wherein, when the pitch between adjacent slit-shaped openings is P, and the width of the upper electrode between adjacent slit-shaped openings is L, L/P is in a range of 45% to 55%, and wherein, when transmittance is T, and a drive voltage which is applied between the upper electrode and the lower electrode is V, an efficiency value E expressed by $T^3/V$ is equal to or greater than 95% of the maximum value, and the transmittance T is equal to or greater than 98% of the maximum value.

2. The liquid crystal display panel according to claim 1, wherein the upper electrode is a common electrode.

* * * * *